UNITED STATES PATENT OFFICE.

THOMAS J. MAYALL, OF READING, MASSACHUSETTS.

RENDERING WOVEN HOSE-PIPE IMPERVIOUS TO WATER.

SPECIFICATION forming part of Letters Patent No. 247,833, dated October 4, 1881.

Application filed March 24, 1881. (No model.)

*To all whom it may concern:*

Be it known that I, THOMAS J. MAYALL, of Reading, in the county of Middlesex and Commonwealth of Massachusetts, have invented a new and useful improvement in the preparation or treatment of woven hose-pipe to render it impervious to water and preserve it from decay, and at the same time in some degree increase its strength.

To practice my invention I make a compound solution of india-rubber and paraffine in naphtha, in the proportions of about two-thirds of a pound of pure rubber to one gallon of naphtha, the rubber being thoroughly dissolved, and then I add and thoroughly mix and dissolve in the solution of rubber in naphtha about two pounds of melted paraffine. With this mixture I fill the pores and interstices of the woven fabric of the hose, and coat the outside and inside also. The naphtha evaporates and leaves the mixture of rubber and paraffine in and on the surfaces of the hose. Thus I render hose woven of cotton or linen fabric, or from other suitable fibrous materials, wholly impervious to moisture and incapable of injury in the least degree by the action of water or moisture, no matter how or during what time it may be exposed, and increase its ability to resist strain, abrasion, cuts, and ordinary wear and tear.

Any method of manipulation of the hose to be treated and the compound used in the treatment which will incorporate it thoroughly in the body of the woven fabric and at the same time or after coat both sides may be adopted; but I prefer to first fill the inside of the woven tube with the mixture heated, the tube being in a perpendicular position, with the lower end closed, and after the mixture has penetrated the cloth then immerse it in a bath of the heated mixture. From this bath it should be run out between a pair of rolls in the manner of a wringing-machine, with an attachment in front of the rolls to clean off any surplus of the mixture which may accumulate on the edges of the flattened hose.

Heretofore it has been proposed to waterproof woven fabric with a compound of rubber and paraffine liquefied by heat. I have found that the naphtha in the compound renders it much more penetrating and materially assists in bringing it into all parts of the fabric. The method of impregnating the hose by forcing the liquid through the fabric by passing between rollers is considered important, new, and useful.

I claim as new—

1. The process of treating woven hose-pipe and similar material to render the same impervious to moisture by saturating and coating it in the manner described with a solution in naphtha of rubber and paraffine, substantially as set forth.

2. The method of impregnating woven tubing with composition for hose or other purpose by filling the tubing with the composition, and after closing one end running it between rollers, substantially as described.

THOS. J. MAYALL.

Witnesses:
 CHS. HOUGHTON,
 F. L. HOUGHTON.